United States Patent
Hasselius

(10) Patent No.: US 12,449,344 B1
(45) Date of Patent: Oct. 21, 2025

(54) HOOD FILTER DIAGNOSTIC MACHINE

(71) Applicant: Dustin Hasselius, Mora, MN (US)

(72) Inventor: Dustin Hasselius, Mora, MN (US)

( * ) Notice: Subject to any disclaimer, the term of this patent is extended or adjusted under 35 U.S.C. 154(b) by 0 days.

(21) Appl. No.: 19/010,133

(22) Filed: Jan. 5, 2025

(51) Int. Cl.
G01N 15/08 (2006.01)
G08B 21/00 (2006.01)

(52) U.S. Cl.
CPC ... G01N 15/0826 (2013.01); *G01N 2015/084* (2013.01)

(58) Field of Classification Search
CPC .... G01N 15/00; G01N 15/08; G01N 15/0826; G01N 2015/084; G08B 21/00
See application file for complete search history.

(56) References Cited

U.S. PATENT DOCUMENTS

| | | | | |
|---|---|---|---|---|
| 3,890,827 A | * | 6/1975 | Van Schoyck | A62C 3/006 55/DIG. 36 |
| 8,487,776 B2 | * | 7/2013 | Livchak | G01G 19/52 340/607 |
| 11,226,277 B2 | * | 1/2022 | Chilumukuru | G01N 15/0826 |
| 11,478,732 B2 | * | 10/2022 | Wetherill | B01D 35/1435 |
| 2006/0100796 A1 | * | 5/2006 | Fraden | A47L 9/19 702/50 |
| 2009/0044600 A1 | * | 2/2009 | Morse | G01N 1/38 73/863 |

FOREIGN PATENT DOCUMENTS

| | | | | |
|---|---|---|---|---|
| CN | 114076333 A | * | 2/2022 | F24F 5/0096 |
| EP | 2188574 B1 | * | 7/2014 | F24C 15/2021 |

OTHER PUBLICATIONS

CN-114076333-A Machine Translation (Year: 2022).*

* cited by examiner

*Primary Examiner* — Nguyen Q. Ha
(74) *Attorney, Agent, or Firm* — Sam Pierce

(57) ABSTRACT

The present invention is a diagnostic machine designed to evaluate the performance of kitchen exhaust hood filters in commercial settings. The machine measures critical parameters, including airflow (CFM), static pressure drop, and grease buildup weight, to optimize filter maintenance schedules. It features a sealed filter chamber accommodating standard hood filters, a centrifugal blower for controlled airflow generation, and a honeycomb flow straightener to ensure laminar airflow. Integrated sensors provide precise measurements: a CFM sensor for airflow volume, differential static pressure sensors for pressure drop, and a load cell scale for grease weight. The device includes a digital interface with a 7-inch touchscreen for real-time data display, logging, and wireless transmission via Wi-Fi or Bluetooth. Constructed with durable, corrosion-resistant materials, the machine is designed for stationary use in commercial kitchens, offering a compact, reliable, and user-friendly solution to improve energy efficiency, reduce fire risks, and extend the lifespan of exhaust systems.

8 Claims, 2 Drawing Sheets

HOOD FILTER DIAGNOSTIC MACHINE

BACKGROUND OF THE INVENTION

Field of Invention

This invention pertains to the field of diagnostic and maintenance systems for commercial kitchen exhaust systems, particularly focusing on the evaluation and optimization of hood filter performance. The system integrates advanced measurement technologies, including airflow (CFM) monitoring, static pressure analysis, and grease buildup quantification. By addressing the challenges associated with grease accumulation and airflow resistance, the invention aims to enhance operational efficiency, reduce energy consumption, and mitigate fire hazards. Furthermore, it introduces a compact, user-friendly diagnostic device tailored to meet the demanding environmental conditions of commercial kitchens.

BRIEF SUMMARY OF THE INVENTION

The present invention introduces a compact and efficient diagnostic machine designed to evaluate the performance of kitchen exhaust hood filters in commercial settings. The machine incorporates a sealed filter chamber, airflow inlet and outlet ducts, and a suite of sensors to measure critical parameters, including airflow (CFM), static pressure drop, and grease buildup weight. Equipped with a precision load cell, differential pressure sensors, and a digital interface, the system provides real-time diagnostic data that enables kitchen operators to optimize filter maintenance schedules, improve energy efficiency, and reduce fire risks. The device's robust construction and integrated control system, powered by a microcontroller, ensure reliable operation in challenging commercial kitchen environments.

DETAILED DESCRIPTION

Figure 1:
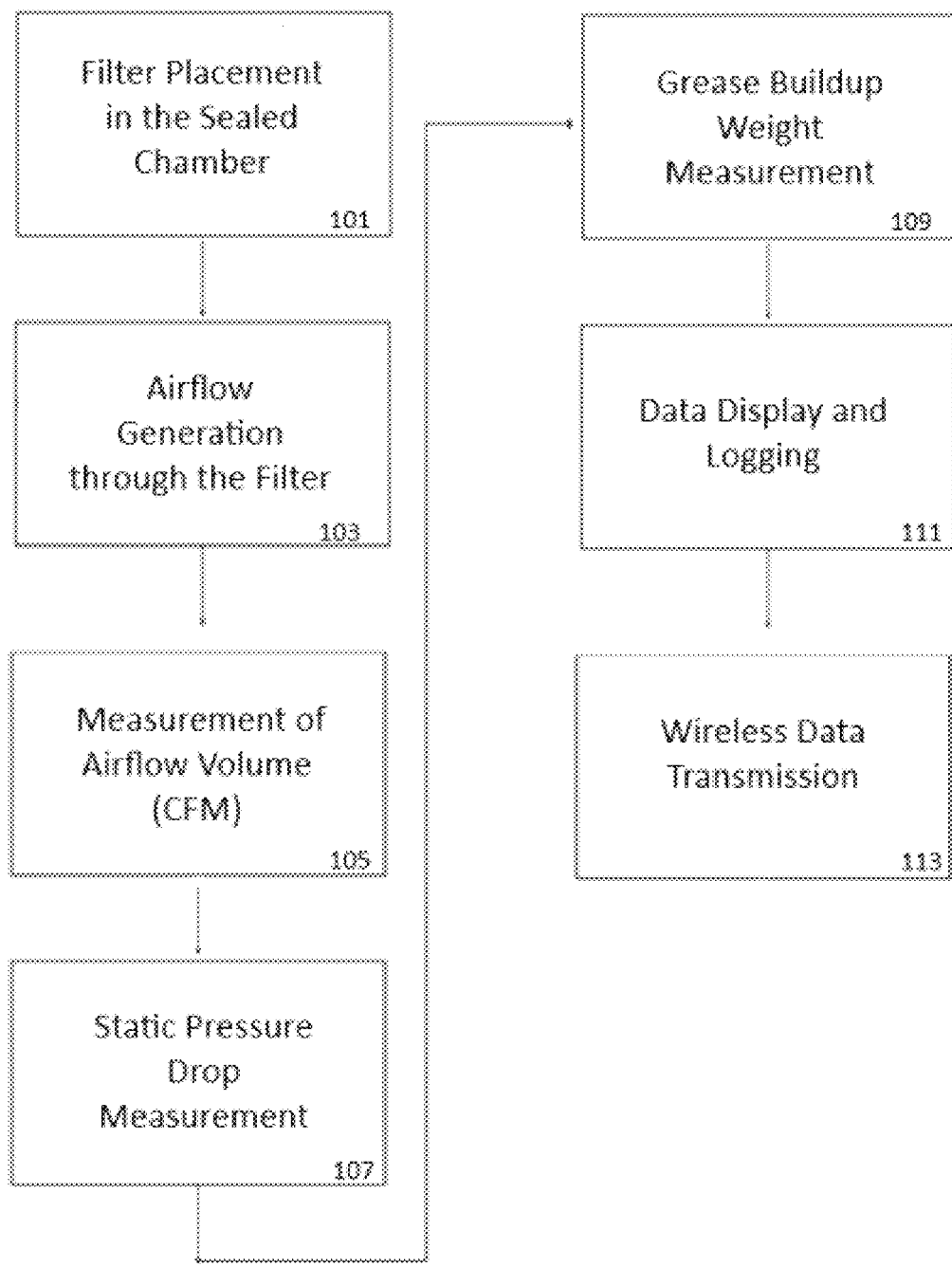
FIG. 1: The diagnostic machine evaluates kitchen hood filters through a systematic 7-step process, beginning with filter placement in the sealed chamber (1.101), airflow generation (1.103), airflow volume measurement (1.105), static pressure drop measurement (1.107), grease weight analysis (1.109), data display and logging (1.111), and ending with wireless data transmission (1.113).

The present invention introduces an advanced diagnostic machine specifically designed to evaluate the performance of kitchen hood filters in commercial environments. This system addresses critical maintenance needs by precisely measuring airflow (CFM), static pressure drop, and grease buildup weight. Its design combines robust mechanical components, advanced sensors, and a user-friendly digital interface to optimize maintenance schedules, reduce energy consumption, and enhance the operational efficiency of commercial kitchen exhaust systems.

The diagnostic machine features a sealed filter chamber, measuring 24 inches (L)×22 inches (H)×4 inches (W), constructed from corrosion-resistant materials such as aluminum or stainless steel. The chamber is designed to accommodate standard 20-inch×20-inch×2-inch hood filters, providing a controlled environment for diagnostics. Gasket seals ensure a leak-proof chamber, minimizing airflow inconsistencies during testing and preventing external environmental factors from interfering with measurements.

Airflow is generated by a 6-inch centrifugal blower connected to the inlet duct. This blower is capable of delivering controlled and consistent airflow through the filter. The inlet duct, measuring 6 inches in diameter and 12 inches in length, includes a honeycomb flow straightener constructed of corrosion-resistant materials such as aluminum or plastic. The straightener stabilizes the airflow by reducing turbulence and ensuring laminar flow before the air passes through the filter. Positioned 2-3 inches inside the inlet duct, the honeycomb cells, measuring 5-10 mm in diameter, are optimized for precision airflow management. The outlet duct, also 6 inches in diameter and 8 inches in length, directs the filtered airflow and houses a critical measurement point for airflow volume.

The machine employs a suite of precision sensors to monitor and evaluate filter performance. A CFM sensor (34), positioned 6 inches downstream in the outlet duct, measures airflow volume with high accuracy, providing real-time data on the ventilation system's effectiveness. Differential static pressure sensors are strategically placed 1 inch before and 1 inch after the filter to measure the pressure drop caused by grease accumulation. These measurements enable the system to detect resistance levels, which are indicative of filter clogging or reduced performance. Additionally, a precision load cell platform is installed beneath the filter chamber to measure the weight of the grease-laden filter. By quantifying grease buildup, the system offers a reliable metric for determining the effectiveness of cleaning procedures and the urgency of maintenance.

Data from the sensors is processed and displayed through an integrated control system powered by an Arduino microcontroller or an equivalent processing unit. The system features a 7-inch touchscreen display that provides an intuitive interface for users to access real-time diagnostic metrics, including airflow volume (CFM), static pressure drop (inches of water column), and grease weight (grams). The interface also logs data locally for historical comparisons and long-term maintenance planning. Wireless connectivity, via Wi-Fi or Bluetooth, enables seamless transmission of logged data to facility management systems for remote monitoring and integration with maintenance tracking software.

The machine's structural design emphasizes durability and ease of use in demanding commercial kitchen environments. Constructed from durable, corrosion-resistant materials, the device is designed for stationary use, with a fixed base equipped with rubber feet to ensure stability during operation. All electronic components, including the microcontroller and touchscreen display, are housed within a waterproof and grease-resistant enclosure to protect against environmental hazards such as moisture and grease. The wiring pathways are carefully designed for safe and clean integration of all components, minimizing exposure and ensuring reliable operation.

The diagnostic machine operates through a systematic process, beginning with the placement of the hood filter into the sealed chamber. Controlled airflow is generated by the centrifugal blower, and key parameters are measured by the integrated sensor suite. Data is displayed in real time on the touchscreen and logged for future reference. The system also supports wireless transmission of diagnostic results, enabling remote access and analysis. This comprehensive functionality allows kitchen operators to implement data-driven maintenance schedules, reducing energy consumption, mitigating fire risks, and extending the lifespan of exhaust systems.

This invention represents a significant advancement in commercial kitchen maintenance technology. By combining precise measurement capabilities with robust construction and user-friendly controls, the diagnostic machine empowers operators to optimize hood filter performance efficiently and effectively, ensuring compliance with safety standards and reducing operational costs.

DETAILED DESCRIPTION OF FIGURES

FIG. 1.101: Filter Placement in the Sealed Chamber—The user inserts the kitchen hood filter into the sealed chamber, ensuring the gasket seals are properly engaged to eliminate airflow leaks. The chamber is designed to fit standard 20-inch×20-inch×2-inch filters, providing a controlled environment for precise diagnostics.

FIG. 1.103: Airflow Generation through the Filter—The centrifugal blower is activated to generate controlled airflow through the inlet duct. The airflow passes through a honeycomb flow straightener, which stabilizes the air and ensures laminar flow before reaching the filter. The blower settings can be adjusted to simulate varying operational conditions.

FIG. 1.105: Measurement of Airflow Volume (CFM)—The airflow continues through the filter and exits via the outlet duct, where a CFM sensor positioned 6 inches downstream records the airflow volume. This measurement helps determine the efficiency of the filter in maintaining adequate ventilation.

FIG. 1.107: Static Pressure Drop Measurement—Differential static pressure sensors measure pressure at two points: 1 inch before the filter (inlet side) and 1 inch after the filter (outlet side). The pressure drop indicates resistance caused by grease buildup, providing insights into filter performance and clogging levels.

FIG. 1.109: Grease Buildup Weight Measurement—The load cell scale positioned beneath the filter chamber measures a weight of the filter. The machine determines grease accumulation on the filter by comparing a weight of the filter before the filter is removed from the chamber to be cleaned by a cleaning process to a weight of the filter after the filter has been cleaned by the cleaning process and placed back into the chamber for continued testing. The machine therefore can quantify grease accumulation on the filter and evaluate effectiveness of the cleaning process.

FIG. 1.111: Data Display and Logging—The measurements are displayed in real-time on the 7-inch touchscreen interface, presenting metrics such as airflow volume, static pressure drop, and grease weight. Simultaneously, the data is logged locally for future analysis and maintenance scheduling.

FIG. 1.113: Wireless Data Transmission—Logged data is transmitted wirelessly via Wi-Fi or Bluetooth to facility management systems. This feature enables remote monitoring, comparative analysis, and seamless integration with maintenance tracking software, ensuring actionable insights for optimized filter performance.

Figure 2:
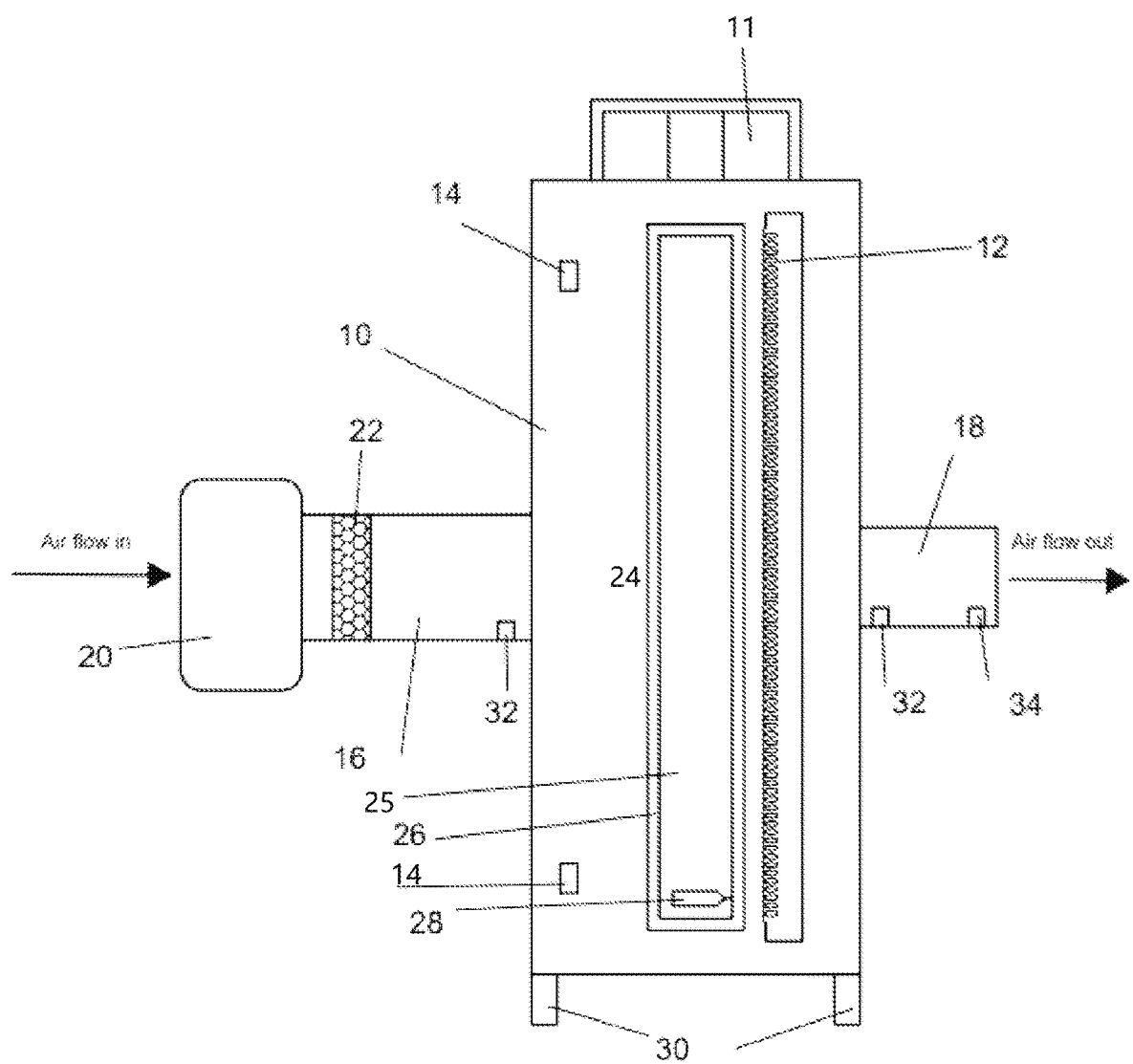
FIG. 2 illustrates the detailed construction of the diagnostic machine (10), digital interface (11), hinged door (12), differential static pressure senor (32), CFM sensor (34), inlet duct (16), outlet duct (18), blower fan (20), honeycomb structure (22), sealed filter chamber (24) with gasket (26) for hood filter (25), load cell scale positioned beneath the filter chamber (28) for grease weight measurement, and rubber feet (30) for stability.

FIG. 2 provides a comprehensive depiction of the key structural components of the diagnostic machine, emphasizing its robust and efficient design for evaluating kitchen hood filters.

The core of the system is the filter chamber (10), which is designed to accommodate standard 20-inch×20-inch×2-inch hood filters. This chamber is constructed from corrosion-resistant materials to withstand harsh commercial kitchen environments. Access to the chamber is facilitated by a hinged door (12), allowing users to easily insert and remove filters for testing. The door is equipped with a locking tab (14) to securely close the chamber during operation, ensuring a sealed environment that prevents airflow leaks.

Airflow is directed through the system via an inlet duct (16) and an outlet duct (18), both measuring 6 inches in diameter. The blower fan (20), connected to the inlet duct, generates controlled airflow through the system. To stabilize the airflow and reduce turbulence, a honeycomb structure (22) is positioned within the inlet duct. This structure, made of corrosion-resistant materials such as aluminum or plastic, features cell sizes of 5-10 mm to ensure laminar flow as air enters the filter chamber.

The sealed chamber (24) houses the filter and is reinforced with a gasket (26) along the edges to create an airtight seal, eliminating the risk of external air infiltration that could compromise measurement accuracy. Beneath the filter chamber, a precision load cell (28) measures the grease weight of the filter, providing a critical metric for assessing filter cleanliness and performance.

To enhance stability during operation, the system is supported by rubber feet (30), which are affixed to the base of the chamber. These feet reduce vibrations and ensure the machine remains stationary while in use, contributing to the overall accuracy of the measurements.

What is claimed is:

1. A diagnostic machine for evaluating a performance of kitchen hood filters, comprising:
    a sealed filter chamber configured to receive a hood filter,
    an airflow inlet duct and outlet duct arranged to direct airflow through the filter,
    a blower connected to the inlet duct for generating controlled airflow through the filter,
    a CFM sensor positioned within the outlet duct to measure an airflow volume passing through the filter,
    a differential static pressure sensor to measure air pressures before and after the filter,
    a load cell scale positioned beneath the sealed filter chamber to measure grease buildup weight on the filter, and
    a digital interface to display real-time measurements and log data for analysis to test and evaluate performance of the filter.

2. The diagnostic machine of claim 1, wherein the airflow inlet duct includes a honeycomb flow straightener designed to stabilize airflow and reduce turbulence before the airflow passes through the filter.

3. The diagnostic machine of claim 1, further comprising data logging functionality integrated into the digital interface, allowing measurement data to be stored locally or transmitted wirelessly via Wi-Fi or Bluetooth for remote evaluating the performance of the filter.

4. The diagnostic machine of claim 1, wherein the sealed filter chamber is constructed of corrosion-resistant materials to ensure durability in commercial kitchen environments and minimize contamination during the testing and evaluating of the performance of the filter.

5. The diagnostic machine of claim 1, wherein the centrifugal blower provides adjustable airflow rates to simulate varying operational conditions for the filter.

6. The diagnostic machine of claim 1, wherein the differential static pressure sensor is configured with ports respectively located 1 inch before and 1 inch after the filter to measure a pressure drop across the filter due to grease accumulation on the filter.

7. The diagnostic machine of claim 1, wherein the load cell scale is calibrated to detect changes in the grease buildup weight with a resolution of at least 0.1 grams, enabling precise quantification of grease accumulation on the filter over time.

8. The diagnostic machine of claim 1, wherein the machine is designed for stationary operation with rubber feet to ensure stability and minimize effects of vibrations during use.

\* \* \* \* \*